United States Patent
Rahimi et al.

(10) Patent No.: US 10,647,140 B2
(45) Date of Patent: *May 12, 2020

(54) INKJET INK SET WITH A PRE-TREATMENT FIXING FLUID

(71) Applicant: Hewlett-Packard Development Company, L.P., Houston, TX (US)

(72) Inventors: Alireza Rahimi, San Diego, CA (US); George Sarkisian, San Diego, CA (US); Benjamin Abelovski, San Diego, CA (US); Gregg A. Lane, San Diego, CA (US); Tienteh Chen, San Diego, CA (US); Or Brandstein, San Diego, CA (US); Jun Yang, Aguadilla, PR (US); Olakemi Akinlabi, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/080,275

(22) PCT Filed: Jun. 30, 2017

(86) PCT No.: PCT/US2017/040365
§ 371 (c)(1),
(2) Date: Aug. 27, 2018

(87) PCT Pub. No.: WO2018/017307
PCT Pub. Date: Jan. 25, 2018

(65) Prior Publication Data
US 2019/0375223 A1 Dec. 12, 2019

Related U.S. Application Data

(63) Continuation-in-part of application No. PCT/US2017/019582, filed on Feb. 27, 2017, which
(Continued)

(51) Int. Cl.
*B41M 5/00* (2006.01)
*B41J 11/00* (2006.01)
(Continued)

(52) U.S. Cl.
CPC .......... *B41M 5/0023* (2013.01); *B41J 2/2107* (2013.01); *B41J 2/2114* (2013.01);
(Continued)

(58) Field of Classification Search
CPC .......... B65H 23/26; B65H 2404/14211; B41J 3/4078; B41J 11/002; B41J 29/377;
(Continued)

(56) References Cited

U.S. PATENT DOCUMENTS

| 4,204,051 A | 5/1980 | Wellner et al. |
| 5,700,851 A | 12/1997 | Banning et al. |

(Continued)

FOREIGN PATENT DOCUMENTS

| CN | 101590726 | 12/2009 |
| CN | 102884145 | 1/2013 |

(Continued)

OTHER PUBLICATIONS

International Search Report and Written Opinion for PCT/US2017/040365 dated Oct. 5, 2017, 10 pages.
(Continued)

*Primary Examiner* — Manish S Shah
(74) *Attorney, Agent, or Firm* — HP Inc. Patent Department

(57) ABSTRACT

An inkjet ink set containing a pre-treatment fixing fluid including calcium-containing crashing agents; at least a co-solvent; one or more surfactants and a balance of water; and, at least, a liquid ink. The liquid ink includes a pigment dispersion, a surfactant, a polyurethane binder, a co-solvent and a balance of water. Also disclosed are and inkjet printing system containing such ink set and the method for printing in such inkjet printing system.

14 Claims, 2 Drawing Sheets

Related U.S. Application Data is a continuation-in-part of application No. PCT/US2017/019580, filed on Feb. 27, 2017, which is a continuation-in-part of application No. PCT/US2016/043156, filed on Jul. 20, 2016.

(51) Int. Cl.
| | |
|---|---|
| C09D 11/023 | (2014.01) |
| B41J 2/21 | (2006.01) |
| C09D 11/033 | (2014.01) |
| C09D 11/037 | (2014.01) |
| C09D 11/102 | (2014.01) |
| C09D 11/12 | (2006.01) |
| C09D 11/322 | (2014.01) |
| C09D 11/38 | (2014.01) |
| C09D 11/40 | (2014.01) |
| C09D 11/54 | (2014.01) |

(52) U.S. Cl.
CPC ........... *B41J 11/002* (2013.01); *C09D 11/023* (2013.01); *C09D 11/033* (2013.01); *C09D 11/037* (2013.01); *C09D 11/102* (2013.01); *C09D 11/12* (2013.01); *C09D 11/322* (2013.01); *C09D 11/38* (2013.01); *C09D 11/40* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 2/161; B41J 2/1623; B41J 2202/00; B41J 2202/03; B41J 2/14201; B41J 2/045; B41M 5/0047; B41M 5/0011; B41M 5/0017; B41M 7/00; B41M 7/0072; B41M 5/52; B41M 5/5218; D06P 5/001; D06B 19/0076; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| | | | |
|---|---|---|---|
| 5,785,743 A | 7/1998 | Adamic et al. | |
| 5,889,083 A | 3/1999 | Zhu | |
| 6,136,890 A | 10/2000 | Carlson et al. | |
| 7,429,293 B2 | 9/2008 | Cal | |
| 8,008,391 B2 | 8/2011 | Enomoto et al. | |
| 8,025,384 B2 | 9/2011 | Ogasawara et al. | |
| 8,556,402 B2 | 10/2013 | Li | |
| 8,974,049 B2 | 3/2015 | Prasad et al. | |
| 9,090,734 B2 | 7/2015 | Kraiter et al. | |
| 9,296,910 B2 | 3/2016 | Brown et al. | |
| 2007/0219290 A1 | 9/2007 | Sarkisian et al. | |
| 2007/0282037 A1 | 12/2007 | Anderson et al. | |
| 2008/0022887 A1 | 1/2008 | Tanoue | |
| 2008/0138530 A1 | 6/2008 | Lin | |
| 2008/0146691 A1 | 6/2008 | Kruger et al. | |
| 2008/0257203 A1 | 10/2008 | Choy et al. | |
| 2009/0071366 A1 | 3/2009 | Akers et al. | |
| 2009/0185019 A1 | 7/2009 | Ogasawara | |
| 2009/0239996 A1 | 9/2009 | Saito | |
| 2010/0047456 A1 | 2/2010 | Kariya | |
| 2010/0201768 A1 | 8/2010 | Udagawa | |
| 2011/0032303 A1 | 2/2011 | Li | |
| 2011/0164086 A1* | 7/2011 | Ggoto | B41M 5/0017 347/21 |
| 2011/0281988 A1 | 11/2011 | Tanoue | |
| 2012/0035317 A1 | 2/2012 | Roberts et al. | |
| 2013/0083117 A1 | 4/2013 | Ohmoto | |
| 2013/0108809 A1 | 5/2013 | Noguchi et al. | |
| 2013/0201252 A1* | 8/2013 | Namba | B41J 11/0015 347/21 |
| 2013/0209708 A1 | 8/2013 | Gane et al. | |
| 2013/0253130 A1 | 9/2013 | Berge | |
| 2013/0266776 A1 | 10/2013 | Matsuoka et al. | |
| 2013/0267656 A1 | 10/2013 | Berge | |
| 2013/0307914 A1 | 11/2013 | Chen | |
| 2014/0037913 A1 | 2/2014 | Nagahama et al. | |
| 2014/0055520 A1 | 2/2014 | Inumaru et al. | |
| 2014/0192112 A1* | 7/2014 | Nagashima | B41M 7/00 347/21 |
| 2014/0364548 A1 | 12/2014 | Everhardus et al. | |

FOREIGN PATENT DOCUMENTS

| | | |
|---|---|---|
| CN | 104662108 | 5/2015 |
| JP | H0625377 | 2/1994 |
| JP | 2009233486 | 10/2009 |
| JP | 2012201730 | 10/2012 |
| RU | 2264493 | 11/2005 |
| SU | 482433 | 5/1976 |
| WO | WO-2001094480 A3 | 12/2001 |
| WO | WO-2007112244 A2 | 10/2007 |
| WO | WO-2012105949 | 8/2012 |
| WO | WO 2015023274 | 2/2015 |
| WO | WO 2015041702 | 3/2015 |
| WO | WO-2015112115 | 7/2015 |
| WO | WO 2015116028 | 8/2015 |
| WO | WO 2015116029 | 8/2015 |
| WO | WO 2015116030 | 8/2015 |
| WO | WO-2015130498 A2 | 9/2015 |
| WO | WO-2015187143 | 12/2015 |
| WO | WO-2016018306 A1 | 2/2016 |
| WO | WO-2016030452 A1 | 3/2016 |
| WO | WO-2016030454 A1 | 3/2016 |
| WO | WO-2016068985 | 5/2016 |
| WO | WO-2016122563 | 8/2016 |
| WO | WO-2016122566 | 8/2016 |
| WO | WO-2016122569 A1 | 8/2016 |
| WO | WO-2017074349 | 5/2017 |
| WO | WO 2018156156 | 8/2018 |
| WO | WO 2018182568 | 10/2018 |
| WO | WO 2018190806 | 10/2018 |

OTHER PUBLICATIONS

"Definition of compound"—Chemistry Dictionary, 2017, 4 pages.
Nelson, Daniel, "Amino Group: Definition and Examples", Scien Trends, May 16, 2019, 3 pages.
"Alkyl group ", IUPAC Gold Book, 2008, 1 page.

\* cited by examiner

INKJET INK SET WITH A PRE-TREATMENT FIXING FLUID

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for many reasons, including, low printer noise, capability of high-speed recording and multi-color recording. In some instances, an ink set (which may include two or more different colored inks) may be used as an ink source for the inkjet printing system. The ink droplets that are formed from one or more of the inks that are part of an ink set are ejected from a nozzle by the inkjet system onto the paper to produce an image thereon. The inks play a fundamental role in the image quality resulting from this printing technique.

BRIEF DESCRIPTION OF THE DRAWINGS

The drawings illustrate various examples of the present print medium and are part of the specification.

DETAILED DESCRIPTION

Figure 1:
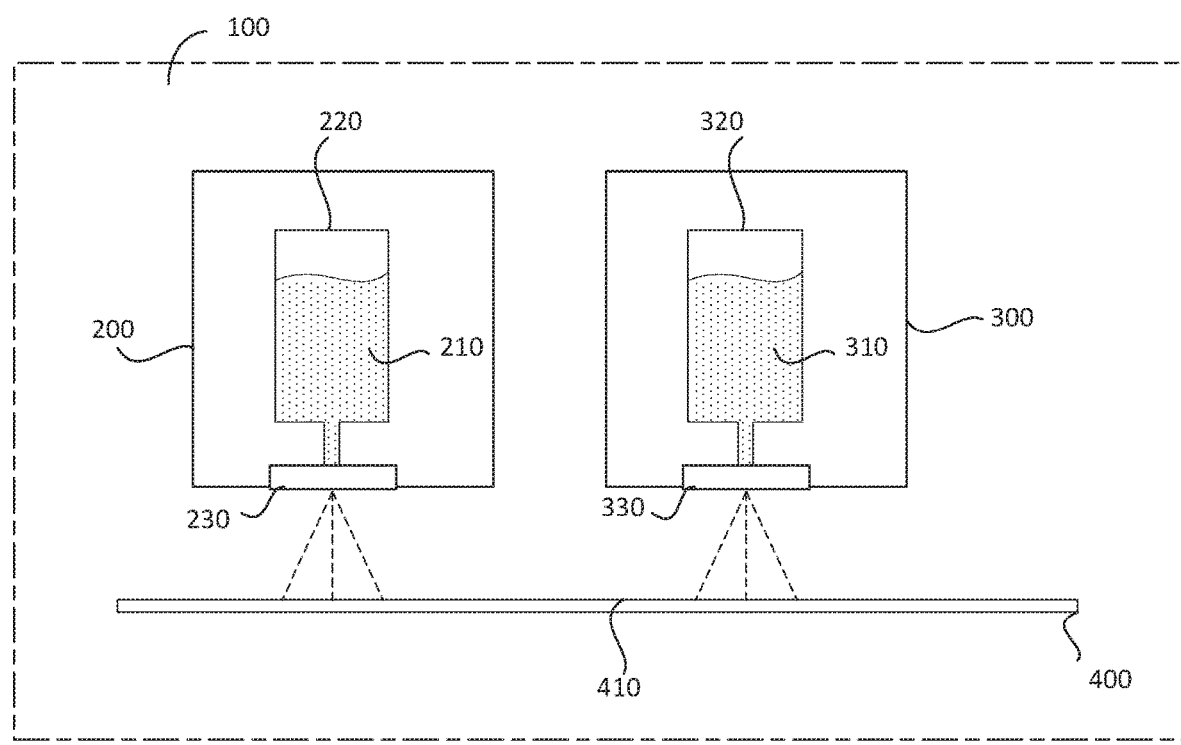
FIG. 1 is a schematic illustration of an example of an inkjet printing system according to one example of the present disclosure.

Before examples of the present disclosure are disclosed and described, it is to be understood that the present disclosure is not limited to the particular process and materials disclosed herein. It is also to be understood that the terminology used herein is used for describing examples only and is not intended to be limiting, as the scope of protection will be defined by the claims and equivalents thereof. In describing and claiming the present composition and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. The percent are by weight (wt %) unless otherwise indicated. As used herein, "image" refers to marks, signs, symbols, figures, indications, and/or appearances deposited upon a material or substrate or printable medium, with either visible or an invisible ink composition.

In inkjet printing, aqueous-based inks are often used on uncoated media, in part because the high surface energy of the aqueous ink enables the ink to spread well on the uncoated media. Aqueous inks may also be desirable for printing on coated offset media. However, coated offset media may be a slow-absorbing medium with high hold-out (i.e., colorants tend to remain on the surface of the media). Additionally, coated offset media may have a relatively low surface energy, and the higher surface energy aqueous inks may not spread well. As a result, images formed from aqueous inks on coated offset media tend to have reduced image quality attributes, such as, for example, gloss or optical density.

For recently-developed industrial printers, such as HP PageWide C500 Press and others, control of bleed and coalescence and avoiding text feathering at high speed can be challenging, especially when printing on coated offset media, which may not be suitable for rapid aqueous ink absorption. As used herein, high speed may refer to print speeds of at least 50 feet per minute (fpm), and up to 1000 fpm.

In various types of inkjet printing, pre-treatment compositions have been applied on the print recording medium before the application of an ink composition in view of improving printing characteristics and attributes of the image. In theory, pre-treatment fixing compositions may render coated offset media more suitable for printing with aqueous-based inks.

For high speed inkjet printing, wet-on-wet printing (i.e., wet ink deposited on wet pre-treatment fluid) may be desirable, for example, so that in-line printing can be performed. Wet-on-wet printing could also enable the use of commercially available coated offset media which does not include any pre-treatment composition thereon, and thus may otherwise be undesirable for high speed inkjet printing. The chemistry involved in wet-on-wet printing is complex, due in part to the interaction between the media and the pre-treatment composition, and between the pre-treatment composition and the ink(s). In addition, for wet-on-wet printing, the slow-absorbing nature of coated offset media requires the pre-treatment composition to be highly (i.e., immediately) reactive with subsequently deposited inks in order to control bleed and pigment floatation (i.e., dot gain). The desired reactivity may be accomplished by increasing the organic acid salt content; however, it has been found that a higher salt content can lead to pen reliability issues resulting from corrosion, and to the formation of prints with poor durability.

It has been discovered that an inkjet ink set comprising a specific combination of a pre-treatment fixing fluid and of specific liquid inks is particularly suitable for wet-on-wet printing on coated offset media. The pre-treatment fixing fluid includes a combination of salts that is capable of dynamically lowering the surface tension of the pre-treatment fluid and that is capable interact very efficiently with the specific ink contained in the inkjet ink set described herein.

The inkjet ink set, when used in a printing process, has the ability to provide prints with improved print quality, specifically during high-speed printing (e.g., during the printing of at least one hundred pages per minute) and good durability. In addition, the inkjet ink set, when used in a printing process, exhibit improved print reliability (e.g., in terms of nozzle health and kogation). Image quality performance may be measured in terms of the optical density, coalescence, and gloss of a printed image. The term "optical density," as referred to herein, means the ability of a printed image to retard light rays. A higher optical density equates to better image quality performance. The term "coalescence," as used to herein, refers to the phenomenon of separately deposited drops of ink. Coalescence can lead to blurring of the printed image and therefore, to poor image quality performance. The term "gloss," as referred to herein, means the shine or luster of a printed image. A higher gloss is indicative of good image quality performance. Durability performance may be measured in terms of the mechability and abrasion resistance of a printed image. The term "mechability," as referred to herein, is a form of durability, and means the ability of a printed image to remain undamaged when rubbed immediately after printing.

The ink sets of the present disclosure also have good jettability performances (i.e. good print reliability). The ink sets of the present disclosure have indeed good decap performance. The term "decap performance," as referred to herein, means the ability of the inkjet ink to readily eject from the printhead, upon prolonged exposure to air. The decap time may be measured as the amount of time that the pen (in a printhead) may be left uncapped (i.e., exposed to air) before the printer nozzles no longer fire properly, potentially because of clogging, plugging, or retraction of solid(s) in the fluid from the drop forming region of the nozzle/firing chamber. In other words, the uncapped time for a thermal inkjet pen may be the length of time that the pen can remain unused and uncapped before spitting (one example of pen servicing) would be required to form an acceptable quality drop. A decreased uncapped time can lead to poor print reliability. In some examples, it is desired for the uncapped time to be from about five minutes to about ten minutes. In other examples, it is desired for the uncapped time to exceed six minutes, especially in the newer, high speed, industrial printers.

The present disclosure relates to inkjet ink set comprising a pre-treatment fixing fluid including calcium-containing crashing agents, at least a co-solvent, one or more surfactants, and a balance of water and, at least, a liquid ink, including a pigment dispersion, a surfactant, a polyurethane binder, a co-solvent and a balance of water. The present disclosure also relates to an inkjet printing system comprising: a fixer dispensing unit for applying a pre-treatment fixing fluid composition on a printable medium, wherein the pre-treatment fixing fluid composition comprises calcium-containing crashing agents, at least a co-solvent, one or more surfactants, and a balance of water; and, at least an ink dispensing unit, for applying an ink composition on the printable medium, wherein the ink composition comprises a pigment dispersion, a surfactant, a polyurethane binder, a co-solvent and a balance of water.

The present disclosure also relates to a method for printing in an inkjet printing system, the method comprising applying a pre-treatment fixing fluid composition on a printable medium, the pre-treatment fixing fluid composition comprising calcium-containing crashing agents, at least a co-solvent, one or more surfactants, and a balance of water; applying an ink composition over the fixer composition, on the printable medium while the fixer composition is wet, wherein the ink composition comprises a pigment dispersion, a surfactant, a polyurethane binder, a co-solvent and a balance of water and drying the fixer composition and the ink composition to obtain a print on the printable medium.

The term "ink set" refers to all individual inks or fluids an inkjet printer is equipped to jet. The term "ink set" can refer to a composition package comprising different type of fluids such as a pre-treatment fixing fluid (or fixer) and some inks. The ink set can also comprise a pre-treatment fixing fluid and two or more ink compositions having different colors from each other and that might be used in conjunction, in a common printer system, to form a color image. All fluid compositions present in a common printer can be considered an ink set, or a few inks from a larger group on inks can be considered to be an ink set.

As used herein, the term "inkjet" ink set refers to herein to an ink set that would be used in an inkjet printing system or inkjet printer. Such inkjet printing system or printer can be a thermal inkjet printer, piezoelectric inkjet printers, other drop on demand inkjet printers, and/or continuous inkjet printers.

As used herein, the term "pre-treatment fixing" composition designates any fluid composition that can be printed onto a media before the application of an ink composition; such pre-treatment fixing" composition can also be called "fixer composition" or pre-treatment composition. In theory, pre-treatment may render coated offset media more suitable for printing with aqueous-based inks. Pre-treatment compositions are often substantially colorless liquids that interact with the colorant and/or with polymeric components of the ink composition in order to precipitate the colorants or otherwise fix the ink composition to the print media surface. The precipitated colorants tend to deposit on the surface of the recording medium, which contributes to the enhancement of image quality attributes, such as, for example, good optical density.

The inks described herein are liquid thermal inkjet ink that include a colorant dispersed in an ink vehicle. As used herein, the term "ink vehicle" refers to the combination of at least one or more solvents and water to form a vehicle in which the colorant is placed to form an ink. The ink vehicle for these respective inks is formulated so that the vehicle is compatible with polyurethane as a binder (described in further detail below). The term aqueous vehicle can refer to water or a mixture of water and at least one water-soluble or partially water-soluble organic solvent (co-solvent, i.e. glycerol, 2-hydroxyethyl 2-pyrrolidone).

The inkjet ink set of the present invention disclosure comprises a pre-treatment fixing fluid and, at least, a liquid ink. The pre-treatment fixing fluid includes calcium-containing crashing agents, at least a co-solvent, one or more surfactants, and a balance of water. The liquid ink, includes a pigment dispersion, a surfactant, a polyurethane binder, a co-solvent and a balance of water.

In some examples, the inkjet ink set of the present invention disclosure comprises a pre-treatment fixing fluid and several liquid inks, such inks being one or several inks selected from the group consisting of a black ink with a black pigment dispersion; a yellow ink with a yellow pigment dispersion; a cyan ink with a cyan pigment dispersion and a magenta ink with a magenta pigment dispersion. At least of these inks include a surfactant, a polyurethane binder, a co-solvent and a balance of water. In some other examples, the inkjet ink set further comprises one or several liquid inks selected from the group consisting of orange ink with an orange pigment dispersion; a violet ink with a violet pigment dispersion; and/or a green ink with a green pigment dispersion. At least one of these inks includes a surfactant, a polyurethane binder, a co-solvent and a balance of water. In yet some other examples, the inkjet ink set of the present invention disclosure comprises several liquid inks, such inks being one or several inks selected from the group consisting of a black ink with a black pigment dispersion; a yellow ink with a yellow pigment dispersion; a cyan ink with a cyan pigment dispersion; a magenta ink with a magenta pigment dispersion; an orange ink with an orange pigment dispersion; a violet ink with a violet pigment dispersion and a green ink with a green pigment dispersion and wherein at least one of these inks further includes a surfactant, a polyurethane binder, a co-solvent and a balance of water.

The Pre-Treatment Fixing Fluid

The pre-treatment fixing fluid includes a crashing agent or a combination of particular crashing agents to prevent ink pigment migration (which leads to better image quality) and to facilitate fast drying. It has been found that high levels of crashing agents often used in pre-treatment fixing fluids to achieve the desired image and text quality has caused pen nozzle health problems, such as poor uncapped start up performance. The term "crashing agent" refers herein to any single chemical or combination of chemicals in the pre-treatment fixing fluid that can facilitate the desolubilization or precipitation of components in the ink. In the examples disclosed herein, a pre-treatment fixing fluid has been developed that includes particular crashing agents that improves fixer pen start up from an uncapped position (i.e., uncapped start up performance). In other words, the fixer pens dispensing the pre-treatment fixing fluid disclosed herein is considered to exhibit significantly better recovery and reliability.

The inkjet ink set of the present disclosure comprises a pre-treatment fixing fluid and, at least, a liquid ink. The pre-treatment fixing fluid, or fixer composition, or pre-treatment composition, includes calcium-containing crashing agents, at least a co-solvent, one or more surfactants and a balance of water.

In some examples, the pre-treatment fixing fluid includes a calcium-containing crashing agents that is a cationic calcium-containing crashing agents. The crashing agents includes metal salts comprising calcium. The calcium-containing crashing agents can be a mixture of organic and inorganic calcium salt. In some other examples, the calcium-containing crashing agents is a cationic mixture of organic and inorganic calcium salt. In yet some other examples, the calcium-containing crashing agents can be a mixture of a metal carboxylate salt and of a water-soluble polyvalent metal salt comprising calcium.

As metal carboxylate salt, it is meant herein a metal salt composed of a multivalent metallic ion and of a carboxylate ion. The metal carboxylate salt can be selected from the group consisting of calcium propionate salt, calcium acetate salt and calcium butyrate salt. In some examples, the metal carboxylate salt is calcium propionate. As water-soluble polyvalent metal salt, it is meant herein a water-soluble polyvalent metal salt with calcium. Example of such compound include calcium nitrate, $CaCl_2$, $Ca(OH)_2$ and $(CH_3COO)_2Ca$. The water-soluble polyvalent metal salt can be calcium nitrate.

In some examples, the calcium-containing crashing agents consisting of calcium propionate and calcium nitrate. In some other examples, the pre-treatment fixing fluid includes a calcium-containing crashing agents that is a cationic calcium-containing crashing agents consisting of calcium propionate and calcium nitrate.

The pre-treatment fixing fluid can include calcium-containing crashing agents consisting of calcium propionate and calcium nitrate. The calcium propionate may be present in an amount ranging from 0 weight percent (wt %) to about 10 wt % based on a total wt % of the pre-treatment fixing fluid, while the calcium nitrate may be present in an amount ranging from about 15 wt % to 0 wt % based on the total wt % of the pre-treatment fixing fluid. Furthermore, these two calcium salts can be used individually and the result is almost the same as the combination. If one of the two calcium salts is 0 wt %, the other of the calcium salts can be at its maximum weight percent. In some examples, the pre-treatment fixing fluid includes calcium-containing crashing agents consisting of calcium propionate and calcium nitrate, at least a co-solvent; one or more surfactants and a balance of water wherein the calcium propionate is present in an amount ranging from 0 wt % to about 10 wt % based on a total wt % of the pre-treatment fixing fluid, and the calcium nitrate is present in an amount ranging from about 15 wt % to 0 wt % based on the total wt % of the pre-treatment fixing fluid.

In some other examples, the pre-treatment fixing fluid includes calcium-containing crashing agents, at least a co-solvent; one or more surfactants and a balance of water wherein the surfactant is selected from the group consisting of a first surfactant having a first hydrophilic lipophilic balance (HLB) value within a hydrophobic range and a combination of the first surfactant and a second surfactant having a second HLB value within a water dispersible range. In yet some other examples, the pre-treatment fixing fluid may have a composition including: calcium-containing crashing agents consisting of calcium propionate and/or calcium nitrate, a co-solvent, one or more surfactants, with a first surfactant having a first hydrophilic lipophilic balance (HLB) value within a hydrophobic range used alone or in combination with a second surfactant having a second HLB value within a water dispersible range; and water.

The pre-treatment fixing fluid can include a first surfactant having a first hydrophilic lipophilic balance (HLB) value within a hydrophobic range, which is used alone or in combination with a second surfactant having a second HLB value within a water dispersible range. The surfactant(s) may be present for wetting and penetrating the print medium. In the ideal case, the surfactant(s) spread uniformly on the print medium. As such, in some examples, using the surfactant having an HLB value within a water dispersible range (i.e., a high HLB surfactant) helps a low HLB surfactant (i.e., having an HLB value within a hydrophobic range), such as Surfynol® SE-F, stay in the pre-treatment fixing fluid and perform as a strong dynamic surfactant. As used herein, a "strong dynamic surfactant" is one that wets the medium vertically and laterally, and the dot gain is big. In contrast, a non-dynamic surfactant lowers the surface tension and moves vertically, and the dot gain is small. Surfynol® SE-F is an ethoxylated acetylenic diol, such as ethoxylated 2,4,7,9-tetramethyl-5-decyne-4,7-diol, and has an HLB of 4 to 5. Examples of hydrophobic surfactants, in addition to Surfynol® SE-F, include Surfynol® 104, Pluronic® L61 and 25R2, and Dynol® 960, 800, and 360. Examples of surfactants having an HLB value within a water dispersible range include Surfynol® CT-211, which is an alkylphenylethoxylate, such as poly(oxy-1,2-ethanediyl), α-(nonylphenyl)-ο-hydroxy-, branched plus 2,4,7,9-tetramethyl-5-decyne-4,7-diol, having an HLB value of 8-12, and Carbowet® GA-211, which may be similar to Surfynol® CT-211, Surfynol® 465 and CT-121, Tergitol® 15s5, 15s7, TMN-3, and TMN-6, Pluronic® 123 and 17R4, and Dynol® 604 and 607.

The surfactant having the lower HLB value (less than about 6) may be present in an amount ranging from about 0.05 wt % to about 1.5 wt % based on the total wt % of the inkjet ink. The surfactant having the higher HLB value (greater than 6) may be present in an amount ranging from 0 wt % to about 0.1 wt % based on the total wt % of the pre-treatment fixing fluid. In some cases, the surfactant with the higher HLB value may not be needed at lower concentrations of the surfactant having the lower HLB value. For example, when using Surfynol® SE-F at low concentrations (i.e., up to about 0.09 wt %), Carbowet® GA-211 may not be needed, since Surfynol® SE-F is soluble at low concentrations. On the other hand, at higher concentrations of the surfactant having the lower HLB value (e.g., Surfynol® SE-F), then the surfactant having the higher HLB value (e.g., Carbowet® GA-211) may be needed to help with the solubility of the surfactant having the lower HLB value.

In some examples, the pre-treatment fixing fluid comprises a first surfactant that includes ethoxylated 2,4,7,9-tetramethyl-5-decyne-4,7-diol and a second surfactant that includes poly(oxy-1,2-ethanediyl), α-(nonylphenyl)-o-hydroxy-, branched plus 2,4,7,9-tetramethyl-5-decyne-4,7-diol.

The pre-treatment fixing fluid includes also, at least, a co-solvent. The co-solvent may be an organic co-solvent, such as aliphatic alcohols, aromatic alcohols, diols, glycol ethers, polyglycol ethers, 2-pyrrolidinones, caprolactams, formamides, acetamides, glycols, and long chain alcohols. In some examples, the co-solvent, in the pre-treatment fixing fluid, is a glycol ether co-solvent. In some other examples, the co-solvent, in the pre-treatment fixing fluid, is tetraethylene glycol. Without being bounded by any theory, glycols have been found to be superior for uncapped start up performance (or recovery), particularly tetraethylene glycol. The co-solvent may be present in total in the pre-treatment fixing fluid in an amount ranging from about 2 wt % to about 20 wt % depending, at least in part, on the jetting architecture of the system used to print the pre-treatment fixing fluid. In an example, the co-solvent is present in the pre-treatment fixing fluid in an amount of about 12 wt % based on the total wt % of the pre-treatment fixing fluid.

The balance of the pre-treatment fixing fluid may be water. The pre-treatment fixing fluid may also include an acid present in an amount sufficient to render a pH of the pre-treatment fixing fluid from about 4.0 to 7.0. The fixer composition can thus include an acid buffer for maintaining the pH of the pre-treatment fixing fluid below 7; for instance, in a range of about 6 to 6.6. The pH of the pre-treatment fixing fluid can be responsible for providing a conducive environment for the reaction between the colorants and the metal salts to occur, for obtaining good quality prints on the substrate. In one example, the acid buffer can be methanesulfonic acid. In said example, the pre-treatment fixing fluid can include about 0.05% to 5% of the acid buffer by weight. In one case, the pre-treatment fixing fluid can include about 0.05% to 2% of the acid buffer by weight. An example of a suitable acid for adjusting the pH is methanesulfonic acid. It is to be understood that the pre-treatment fixing fluid excludes any latex polymer.

In addition to the above compounds, the pre-treatment fixing fluid may include wetting agents, de-foamers, polymers, organic compounds, biocides sequestering agents, viscosity modifiers, surface-active agents, chelating agents, resins, or a combination thereof, to enhance various properties of the pre-treatment fixing fluid or fixer composition.

The Ink

The inkjet ink set of the present disclosure comprises a pre-treatment fixing fluid including calcium-containing crashing agents, at least a co-solvent, one or more surfactants, and a balance of water; and, at least, a liquid ink. The ink used are liquid thermal inkjet ink that include a colorant dispersed in an ink vehicle. The term aqueous vehicle can refer to water or a mixture of water and at least one water-soluble or partially water-soluble organic solvent (co-solvent, i.e. glycerol, 2-hydroxyethyl 2-pyrrolidone). The ink that is part of the ink set includes a pigment dispersion, a surfactant, a polyurethane binder, a co-solvent and a balance of water.

In some examples, the inkjet ink set of the present invention disclosure will comprise a plurality of ink of different color. The ink set will thus include one or several inks selected from the group consisting of a black ink with a black pigment dispersion, a yellow ink with a yellow pigment dispersion; a cyan ink with a cyan pigment dispersion and a magenta ink with a magenta pigment dispersion. The ink set may also include additional ink such as an orange ink with an orange pigment dispersion; a violet ink with a violet pigment dispersion; and/or a green ink with a green pigment dispersion.

Pigments

The ink compositions that are part of the ink set comprise, at least, a pigment. The term pigment refers to any organic or inorganic pigment colorants, magnetic particles, aluminas, silicas, and/or other ceramics, organo-metallics, metallic particulates, or other opaque particles that introduce color to the ink vehicle. Pigments are suspended in the liquid vehicle and are therefore referred as pigment dispersion.

The average particle size of the pigments, present in any of the ink composition of the ink set, may range anywhere from about 50 nm to about 200 nm. In an example, the average particle size ranges from about 80 nm to about 150 nm. The total amount of pigment dispersion in the ink can range from about 1.5% to about 5% based on the total weight of the liquid ink. In some examples, the total amount of pigment dispersion in the ink can range from about 2% to about 4% based on the total weight of the liquid ink.

In some examples, the ink set comprises a black ink with a black pigment; a yellow ink comprising with yellow pigment; a cyan ink with a cyan pigment; and/or a magenta ink with a magenta pigment. In some other examples, the ink set further comprises an orange ink with an orange pigment dispersion; a violet ink with a violet pigment dispersion and/or a green ink with a green pigment dispersion.

The black ink, that can be part of the ink set of the present disclosure, includes a black pigment. Said black pigment will provide a black color to the black ink. Carbon black may be a suitable black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation. Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

The yellow ink, that can be part of the ink set of the present disclosure, includes a yellow pigment. Said yellow pigment will provide a yellow color to the yellow ink. Examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 150, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180, C.I. Pigment Yellow 185, and C.I. Pigment Yellow 213. In some examples, the yellow pigment is C.I. Pigment Yellow 74.

The cyan ink, that can be part of the ink set of the present disclosure, includes a cyan pigment. Said cyan pigment will provide a cyan color to the cyan ink Examples of suitable cyan pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

The magenta ink, that can be part of the ink set of the present disclosure, includes a magenta pigment. Said magenta pigment will provide a magenta color to the magenta ink. Examples of suitable magenta pigments are organic pigment that include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 213, C.I. Pigment Red 219, C.I. Pigment Red 224, C.I. Pigment Red 245, C.I. Pigment Red 282, C.I. Pigment Red 286, C.I.

The ink set can further include a violet ink. Said violet ink comprises a violet pigment that will impart a violet color to the ink. Examples of suitable violet organic pigments include C.I. pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, C.I. Pigment Violet 50, and C.I. Pigment Violet 55. In some other examples, the ink set can further include a green ink. Said green ink comprises a green pigment that will impart a green color to the ink. Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

In yet some other examples, the ink set can further include an orange ink. Said orange ink comprises an orange pigment that will impart an orange color to the ink. Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 64, C.I. Pigment Orange 66, and C.I. Pigment Orange 71.

The pigments that are present in any of the ink composition of the ink set, may be dispersed by an anionic polymer (i.e., anionic polymeric dispersant). The dispersant may be present in an amount ranging from about 0.1 wt % to about 5 wt % of a total wt % of the liquid ink. The above-described pigments can be dispersed into a polymeric dispersion. The polymeric dispersion can assist in dispersing the pigment in a solvent system. In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water-soluble. As such, no latex polymer is present in the ink composition. Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, and combinations thereof. Some non-limiting commercial examples of useful styrene acrylic polymers are sold under the trade names Joncryl® (S.C. Johnson Co.), Ucar™ (Dow Chemical Co.), Jonrez® (MeadWestvaco Corp.), and Vancryl® (Air Products and Chemicals, Inc.).

Polyurethane Binder

The ink compositions that are part of the ink set comprise a polyurethane binder. The polyurethane binder is present in the ink in the form of a polyurethane dispersion and is therefore referred to as a polyurethane binder. By "polyurethane dispersion" it is meant herein a polyurethane binder or polyurethane that is dispersed in a liquid medium. In some examples, the polyurethane binder is present in a dispersion with water. As used herein, the term "dispersion" refers to a two-phases system where one phase consists of finely divided particles of polyurethane binder distributed throughout a bulk substance, i.e. liquid vehicle. The polyurethane particles being the dispersed or internal phase and the bulk substance being the continuous or external phase (liquid vehicle).

In some examples, the polyurethane dispersion is present in the ink an amount ranging from about 1 wt % to about 20 wt % based upon the total wt % of the inkjet ink. In some other examples, the polyurethane dispersion is present in the ink an amount ranging from about 2 wt % to about 15 wt % based upon the total wt % of the ink composition. In yet some other examples, the polyurethane dispersion is present in the ink an amount ranging from about 3 wt % to about 10 wt % based upon the total wt % of the ink composition. The weight percentages given for the polyurethane dispersion do not account for any other components (e.g., water) that may be present when the polyurethane is part of the dispersion. The polyurethane dispersion may be added with the pigment (e.g., pigment dispersion) and the components of the ink vehicle to form the liquid thermal inkjet ink.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof. The polyurethanes can include polyurethane, polyurea, polyurethane with a curable double bond, polyurethane-graph polyol, or a combination thereof. In some examples, the polyurethanes binder can be a polyurethane having a curable double bond. The polyurethane binder can have a curable double bond that can be (n-(2-hydroxyethyl)acrylamide2-hydroxyethyl acrylate, 2-hydroxypropyl bis-methyl methacrylate, or a combination thereof. In another example, the polyurethane binder is a polyurethane graph polyol. In a further example, the binder can include a polyurethane graph polyol such as PUG-49, PUG-84, PUG-400 or Pluracol® (available from BASF, New Jersey). In yet another example, the binder can be any of the previously mentioned binders and can further include an acrylic functional group. For example, the binder can include methyl methacrylate, 2-ethylhexyl acrylate, 2-(2-ethoxyethoxy)ethyl acrylate, or a combination thereof.

In some examples, the polyurethanes can have an average molecular weight ranging from 10,000 MW to 100,000 MW. or an average molecular weight ranging from 15,000 MW to 50,000 MW.

In some examples, the polyurethane binder contains a polyisocyanate component (A) and a first polyol (B) and a second polyol (C). The polyurethane binder can also be a polyurethane binder dispersion that comprises (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain. The polyurethane binder can further comprise a component (D) which is a carboxylic acid functional group with two hydroxyl functional groups. The polyurethane binder can further comprise a component (E) with a formula $[(M^+)m; (X)n-R-Y]$ wherein: m is 0 or 1; M is a metal; n is 2 to 10; X is an amino group, R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is $SO_3^-$.

In some other examples, the polyurethane binder may be formed from the following components: (a) a polyisocyanate; (b) a polyol having a chain with two hydroxyl functional groups at one end of the chain and no hydroxyl functional groups at the opposed end of the chain; and (c) an alcohol, or a diol, or an amine with a number average molecular weight less than 500; and one of (i) a carboxylic acid; (ii) a sulfonate or sulfonic acid having one amino functional group; (iii) a combination of (i) and (ii); and (iv) a combination of (i) and a homopolymer or copolymer of poly(ethylene glycol) having one or two hydroxyl functional groups or one or two amino functional groups at one end of its chain.

In yet some other examples, the polyurethane binder is a polyurethane binder dispersion wherein polyurethane comprises: (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain; (D) a carboxylic acid functional group with two hydroxyl functional groups; and (E) a compound shown in formula $[(M^+)m; (X)n-R-Y]$ wherein: m is 0 or 1; M is a metal; n is 2 to 10; X is an amino group, R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is $SO_3^-$. In some other examples, polyurethane further comprises an optional homopolymer or copolymer of poly(ethylene glycol) having one or two hydroxyl functional groups or one or two amino functional groups at one end of its chain (F).

In yet some other examples, the polyurethane comprise: (A) a polyisocyanate, which is an isophorone diisocyanate (IPDI); (B) a first polyol having a chain with two hydroxyl functional groups at one end of the chain and no hydroxyl groups at an opposed end of the chain; (C) a polyether polyol having a chain with two hydroxyl functional groups at both ends of the chain; (D) a carboxylic acid functional group with two hydroxyl functional groups; (E) a sulfonate or sulfonic acid functional group having two amino functional groups; and (F) an optional homopolymer or copolymer of poly(ethylene glycol) having one or two hydroxyl functional groups or one or two amino functional groups at one end of its chain.

The polyurethane can also be defined as the following: (A) is isophorone diisocyanate, which is present in the polyurethane in an amount of from about 24 wt % to about 30 wt % based on the total weight of the polyurethane, (B) is a copolymer of methyl methacrylate-co-ethylhexylacrylate-co-ethoxyethoxyethylate with two hydroxy groups at one end, which is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B), (C) is polypropylene glycol with a $M_n$ of 1000 g/mol, which is present in the polyurethane in an amount of from about 12 wt % to about 18 wt % based on the total weight of the polyurethane, (D) is dimethylolpropionic acid, which is present in the polyurethane in an amount of from about 2 wt % to about 6 wt % based on the total weight of the polyurethane, and (E) is sodium 2-[(2-aminoethyl)amino] ethanesulphonate, which is present in the polyurethane in an amount of from about 8 wt % to about 12 wt % based on the total weight of the polyurethane.

In some examples, when defining (A) the polyisocyanate, any suitable polyisocyanate may be used. Some suitable polyisocyanates have an average of about two or more isocyanate groups. In an example, the polyisocyanate includes an average of from about 2 to about 4 isocyanate groups per molecule and from about 5 to 20 carbon atoms (in addition to nitrogen, oxygen, and hydrogen). Component (A) may be an aliphatic, cycloaliphatic, araliphatic, or aromatic polyisocyanate, as well as products of their oligomerization, used alone or in mixtures of two or more. For example, a polyisocyanate having an average of two or more isocyanate groups may be used. Some examples of polyisocyanates include hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, isophorone diisocyanate (IPDI), dicyclohexylmethane-4,4-diisocyanate (H12MDI), and combinations thereof. The amount of the polyisocyanate in the polyurethane binder ranges from about 20 wt % to about 45 wt % of the total weight of the polyurethane binder. In an example, polyisocyanate makes up from about 25 wt % to about 35 wt % of the polyurethane binder.

The amount of component (B) (i.e., the first polyol) in the polyurethane-based binder dispersion can range from about 10 wt % to about 70 wt % of the total weight of the polyurethane binder. In an example, component (B) (i.e., the first polyol) can make up from about 30 wt % to about 60 wt % of the polyurethane binder. The first polyol (B) can include any product having a chain with two hydroxyl groups at one end of the chain and no hydroxyl groups at the opposed end of the chain. The first polyol has a number average molecular weight (Mn) ranging from about 500 g/mol to about 5000 g/mol. Additionally, the first polyol has a glass transition temperature ($T_g$) ranging from about −20° C. to about 100° C. In an example, the glass transition temperature can range from about 0° C. to about 80° C. The first polyol may be formed from the free radical polymerization of a monomer in the presence of a mercaptan that includes two hydroxyl functional groups or two carboxylic functional groups. Some examples of the monomer used to form component (B) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth)acrylate, hexyl (meth)acrylate, cyclohexyl (meth)acrylate, phenyl (meth)acrylate, benzyl (meth)acrylate, 2-aziridinylethyl (meth)acrylate, aminomethyl acrylate, aminoethyl acrylate, aminopropyl (meth)acrylate, amino-n-butyl(meth)acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate. Some other examples of the monomer used to form component (b) include an acid group containing monomer, such as acrylic acid, methacrylic acid, carboxyethyl (meth)acrylate, 2-(meth)acryloyl propionic acid, crotonic acid, and itaconic acid. In another example, the monomer used to form component (b) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth) acrylamide, and N-isobutoxymethyl (meth)acrylamide. Some further examples of the monomer used to form component (b) may be styrene or a styrene derivative. Some examples of styrene derivatives include alpha-methyl styrene, p-aminostyrene, and 2-vinylpyridine. Additionally, the monomer used to form component (B) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-trifluoroethyl acrylate, 1H,1H,3H-hexafluorobutyl acrylate, 1H,1H,3H-tetrafluoropropyl methacrylate, 1H,1H,5H-octafluoropentyl methacrylate, 1H,1H,5H-octafluoropentyl acrylate, poly(dimethylsiloxane), methacryloxypropyl terminated polydimethylsiloxane DMS-R11 (made by Gelest Chemicals), and (3-acryloxy-2-hydroxypropoxypropyl) terminated polydimethylsiloxane DMS-U21 (made by Gelest Chemicals). It is to be understood that any combination of monomers listed for component (B) may be used.

In some examples, the second polyol (i.e., component (C) can be present in the polyurethane binder in an amount of from about 8 wt % to about 25 wt % based on the total weight of the polyurethane-based binder dispersion. In an example, component (B) (i.e., the first polyol) makes up from about 10 wt % to about 20 wt % of the polyurethane binder. The second polyol(s) can have a number average molecular weight (Mn) of about 500 g/mol to about 3000 g/mol and have one hydroxyl group attached at each end of the polyol. Examples of second polyols include polyester polyols, polyether polyols, polycarbonate polyol, polyester-polycarbonate polyol, or mixtures thereof. In some examples, the second polyol can be poly(propyleneglycol), poly(tetrahydrofuran), poly(carbonate) polyol, or mixtures thereof. Examples of polycarbonate polyol include polycarbonate polyols from Kuraray Co. Ltd. (e.g., C-590, C-1050, C-1090, C-2050, C-2090, and C-3090) and polycarbonate diols from UBE Industries, Ltd. (e.g., Eternacoll® Uh-50, Eternacoll® Uh-100, Eternacoll® Uh-200, Eternacoll® Ph-5-, Eternacoll® Ph-100, Eternacoll® Ph-200 And Eternacoll® Um90(1/3)).

Component (D) can be a carboxylic acid functional group with two hydroxyl functional groups. The amount of component (D) in the polyurethane-based binder dispersion ranges from 1 wt % to about 10 wt % based upon the total weight of the polyurethane. In an example, component (D) makes up from about 2 wt % to about 6 wt % of the polyurethane binder. In some instances, component (D) includes two or more hydroxyl groups. Component (D) may have a number average molecular weight (Mn) of about 500 g/mol. Examples of component (D) may be derived from hydroxy-carboxylic acids having the general formula (HO)xQ(COOH)y, where Q is a straight or branched hydrocarbon radical containing 1 to 12 carbon atoms, and x is 2 or 3 and y ranges from 1 to 3. Examples of component (D) can include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

In some examples, component (E) can be a compound shown in formula $(M^+)$ m; $n(X)n$-R—Y wherein m is 0 or 1; M is a metal; n is 2 to 10; X is an amino group, R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is S03. In some examples, m is 1; M is sodium, potassium, magnesium, calcium, or lithium; n is 2 to 4; X is an amino group; R is a $C_1$ to $C_8$ alkyl group; and Y is S03-. In some other examples, the sulfonate or sulfonic acid amine compound (i.e., component (E)) can have two or more amino functional groups. In some examples, sulfonate or sulfonic acid amine compound (i.e., component (E)) can have two to ten amino functional groups. In some examples, sulfonate or sulfonic acid amine compound (i.e., component (E)) can have two to four amino functional groups. In some examples, sulfonate or sulfonic acid amine compound (i.e., component (E)) can have two amino functional groups. Component (E) may be present in the polyurethane-based binder dispersion an amount ranging from about 1 wt % to about 20 wt % based upon the total weight of the polyurethane-based binder dispersion. In an example, component (E) can be present in an amount ranging from about 2 wt % to about 20 wt % of the polyurethane-based binder dispersion. In another example, component (E) may be present in an amount of about 5 wt % to about 15 wt % of the polyurethane-based binder dispersion.

Some examples of component (E) include ethyldiamineethylsulfonic acid or a salt thereof, ethyldiaminepropylsulfonic acid or a salt thereof, 5-amino-2-(aminomethyl)-1-pentanesulfonic acid or a salt thereof, 2,3-diamino-1-propanesulfonic acid or a salt thereof, 3-[bis(2-aminoethyl) amino]-1-propanesulfonic acid or a salt thereof, 2-[bis(2-aminoethyl) amino]-ethanesulfonic acid or a salt thereof, 2-[(2-aminoethyl)amino]-1-propanesulfonic acid or a salt thereof, 2-[[2-[(1-methylethyl)amino]ethyl]amino]-ethanesulfonic acid or a salt thereof, 2-[(2-aminoethyl)amino]-1-pentanesulfonic acid or a salt thereof, or mixtures thereof. In some other examples, component (E) can also be sodium 2-[(2-aminoethyl) amino]ethanesulphonate or sodium diaminoethylpropylsulfonate.

In some examples, the polyurethane compound further comprises a components (F) which is a Homopolymer or Copolymer of poly(ethylene glycol). The component (F) can be a homopolymer or copolymer of poly(ethylene glycol) having one hydroxyl functional group or one amino functional group. In other examples, component (D) may be a homopolymer or copolymer of poly(ethylene glycol) having two hydroxyl functional groups or two amino functional groups at one end of its chain. The homopolymer or copolymer of poly(ethylene glycol) has a number average molecular weight (Mn) ranging from about 500 g/mol to about 5,000 g/mol. In another example, the homopolymer or copolymer of poly(ethylene glycol) has a number average molecular weight (Mn) ranging from about 500 g/mol to about 3,000 g/mol. Component (F) also has a water solubility of greater than 30% v/v (volume of poly(ethylene glycol) to volume of water). The amount of component (F) in the polyurethane-based binder dispersion ranges from 0 wt % to about 20 wt % based upon the total weight of the polyurethane-based binder dispersion. In an example, component (F) can be present in the polyurethane-based binder dispersion in an amount of from about 5 wt % to about 10 wt %/o of the polyurethane-based binder dispersion.

Any homopolymer of poly(ethylene glycol) with two hydroxyl or amino groups at one end of the polymer chain may alternatively be used as component (F), as long as the homopolymer has water solubility of >about 30% v/v and a suitable number average molecular weight. As an example, the homopolymer may be two hydroxyl terminated poly (ethylene glycol), where both hydroxyls are located at one end of the chain. One commercially available example is YMER™ N120 (a linear di-functional polyethylene glycol monomethyl ether from Perstorp).

Surfactant

The ink compositions that are part of the ink set comprise include surfactants. In some examples, the surfactants are non-ionic surfactant. In some other examples, the surfactants include an acetylenic surfactant and/or a phosphate surfactant.

The surfactant can be present in the ink composition at varying concentrations. In one example, the surfactant can be present in the aqueous ink composition at from about 0.05 wt % to about 4 wt % based on the total wt % of the liquid ink. In another example, the surfactant can be present in the aqueous ink composition from about 0.1 wt % to 3 wt %. In yet another example, the surfactant can be present from about 0.25 wt % to about 1 wt %.

In some examples, the surfactants are acetylenic surfactants. In this example, the acetylenic surfactant may be present in an amount ranging from about 0.10 wt % to about 2 wt % (based on the total wt % of the liquid ink). Acetylenic surfactants can include acetylenic diols, alkoxylated acetylenic diols, and other acetylenic surfactants. Some specific examples include 2,7-dimethyl-4-octyn-3,6-diol, 7-tetradecyn-6,9-diol, 2,4,7,9-tetramethyl-5-decyne-4,7-diol, 1,4-dimethyl-1,4-bi(2-methylpropyl)-2-butyne-,4-diyl ether, ethylene or propylene oxide condensates thereof, or a combination thereof. Some suitable commercially available acetylenic surfactants include Surfynol® and Dynol® surfactants available from Air Products. Examples of non-ionic surfactant can include Surfynol® SE-F, Dynol® 360, Surfynol® S104, Surfynol® S440, Surfynol® CT-211, or a combination thereof (all available from Air Products & Chemicals Inc., Pennsylvania). In another example, the non-ionic surfactant can include. Surfynol® SE-F, Surfynol® S440, or Surfynol® CT-211. In yet another example, the non-ionic surfactant can include Dynol® 360.

In some examples, the surfactants are phosphate surfactants. In this example, the phosphate surfactant may be present in an amount ranging from about 0.10 wt % to about 2 wt % (based on the total wt % of the liquid ink). In some examples, the phosphate surfactant can be a phosphate ester of fatty alcohols or fatty alcohol alkoxylates. In one example, the surfactant can be a mixture of mono- and diesters, and may have an acid number ranging from 50 to 150. In another example, the phosphate-containing surfactant can be of the Crodafos® family. Specific examples include oleth-3 phosphate, oleth-10 phosphate, oleth-5 phosphate, dioleyl phosphate, ppg-5-ceteth-10 phosphate, $C_9$-$C_{15}$ alkyl monophosphate, deceth-4 phosphate, and mixtures thereof. Other specific examples by tradename include Crodafos® N3A, Crodafos® N3E, Crodafos® N10A, Crodafos® HCE, Crodafos® SG, Arlantone® Map 950, Monofax® 831, Monofas® 1214, Monalube® 215, and Atlox® DP 13/6.

In some examples, the ink includes a combination of two type of surfactant (a first and a second). The first surfactant can be less water-soluble surfactants (surfactants with a lower HLB value) and the second surfactant can be higher water-soluble surfactants (surfactants with a higher HLB value). Indeed, it has been found that less water-soluble surfactants (surfactants with a lower HLB value) can be used in combination with higher water-soluble surfactants (surfactants with a higher HLB value) to achieve a surface tension of the ink which leads to improved image quality. In the HLB system, which is for use with nonionic surfactants, the lower the HLB value, the more lipophilic (oil-soluble) the surfactant is, while the higher the HLB value, the more hydrophilic (water-soluble) the surfactant is. The HLB value in the HLB system may range from 0 to 20 or more. In a somewhat more detailed view of the HLB value, a surfactant having a value of 0 to 6 is considered to be hydrophobic (oil-soluble), while a surfactant having a value between 6 and 12 is considered to be water-dispersible, and a surfactant having a value greater than 12 is considered to be hydrophilic (water-soluble).

In some examples, the ink includes a combination of two type of surfactant (a first and a second). The first surfactant can be less water-soluble surfactants (surfactants with a lower HLB value) and the second surfactant can be higher water-soluble surfactants (surfactants with a higher HLB value). The HLB value of the first surfactant may be greater than about 6 and less than about 12, while the HLB value of the second surfactant may be less than about 6. In the mixture of the two surfactants described above, the first HLB value may be less than about 6, while the second HLB value may also be less than about 6.

In one example, the first surfactant (having the HLB value greater than 6 and less than 12) may be present in an amount ranging from about 0.05 weight percent (wt %) to about 2 wt % based on the total wt % of the inkjet ink. The second surfactant (having the HLB value less than 6) may also be present in an amount ranging from about 0.05 wt % to about 2 wt % based on the total wt % of the inkjet ink. The total concentration of the two surfactants in the inkjet ink may be within a range of about 0.1 wt % to about 4 wt %. In another example, the first surfactant (having the HLB value less than 6) may be present in an amount ranging from about 0.05 weight percent (wt %) to about 0.9 wt % based on the total wt % of the inkjet ink. The second surfactant (also having the HLB value less than 6) may also be present in an amount ranging from about 0.05 wt % to about 0.9 wt % based on the total wt % of the inkjet ink. In this case, the maximum concentration of the two surfactants in the inkjet ink may be less than about 0.9 wt %, so as avoid any solubility issues of using two surfactants that each has low water solubility.

Co-Solvent

The ink compositions that are part of the ink set comprises a co-solvent. In some examples, the co-solvent is a glycol ether co-solvent. Examples of the glycol ether co-solvent include glycol alkyl ethers, propylene glycol alkyl ethers, and higher homologs ($C_6$-$C_{12}$) of polyethylene glycol alkyl ethers. Glycol ether co-solvents can have the molecular formula of R'—O—$CH_2CH_2OH$, where R' is a $C_1$-$C_7$ liner, branched, or cyclic alkyl group. In some examples, a single glycol ether co-solvent can be used. In other examples, a combination of glycol ether co-solvents can be used.

In some examples, the glycol ether can include ethylene glycol monobutyl ether. In some other examples, the glycol ether can include tripropylene-glycol methyl ether, dipropylene glycol butyl ether, diethylene glycol ethyl ether, propylene glycol phenyl ether, or a combination thereof. In yet some other examples, the non-volatile glycol ether co-solvent is tripropylene-glycol methyl ether. The glycol ether co-solvent can be a non-volatile glycol ether co-solvent. The non-volatile glycol ether co-solvent can be dipropylene glycol butyl ether, diethylene glycol ethyl ether, or a combination thereof. In a further example, the non-volatile glycol ether co-solvent can be propylene glycol ether. In some examples, the boiling point of the non-volatile glycol ether co-solvent can be 220° C. as mentioned, or can be 240° C. or greater. Examples of non-volatile glycol ether co-solvents having a boiling point over 240° C. can include tripropylene glycol methyl ether, dipropylene glycol butyl ether, or tripropylene glycol propyl ether. In one example, the non-volatile glycol ether co-solvent can be a non-hazardous substance as determined by the EPA at the time of filing the present disclosure. In some examples, the non-volatile glycol ether co-solvent can be hydrophobic and/or include hydrophobic functional groups.

The non-volatile glycol ether co-solvent can be present in the aqueous ink composition at varying concentrations. In one example, the non-volatile glycol ether co-solvent can be present at from about 0.3 wt % to about 4.5 wt %. In another example, the non-volatile glycol ether co-solvent can be present from about 1 wt % to about 3 wt %. In yet another example, the non-volatile glycol ether co-solvent can be present at from about 2 wt % to about 3 wt %.

Humectant Solvent

The ink compositions that are part of the ink set can comprise a humectant solvent. In some examples, the ink composition comprises a humectant solvent including a hydrophilic group. The humectant solvent can include glycerol, Dantocol® DHE (Di-(2-hydroxyethyl)-5, 5 dimethylhydantoin) (available from Lonza® Inc., New Jersey), tetraethylene glycol, tripropylene glycol, 2-hydroxyethyl pyrrolidone (2HE2P), Liponic® EG-1 or LEG-1, or combinations thereof. In one example, the humectant solvent includes glycerol (Glycereth-26). In yet another example, the humectant solvent includes 2-hydroxylethyl-2-pyrrolidone. In a further example, the humectant solvent includes tripropylene glycol. In yet a further example, the humectant solvent includes glycerol, 2-hydroxyethyl-2-pyrrolidone, LEG-1, or a combination thereof. The humectant solvent can be present in the ink composition in an amount representing from about 1 wt % to about 15 wt % of the ink composition. In another example, the humectant solvent can be present from about 2 wt % to about 10 wt %. In yet another example, the humectant solvent can be present from about 3 wt % to about 8 wt % by total weight of the ink composition.

Wax Emulsion

The ink compositions that are part of the ink set may comprise a wax. In other examples, the ink compositions that are part of the ink set comprises a polyethylene (PE) wax emulsion. The polyethylene wax emulsion includes a polyethylene wax. In some other examples, the polyethylene wax emulsion and the inks exclude all other waxes besides the polyethylene wax. Without being linked by any theory, it is believed that the ink, including the wax emulsion may have reduced agglomerate formation (as compared to other comparable inks including other waxes, e.g., polyethylene waxes) in thermal inkjet printhead nozzles both during storage and printing. In some examples, the wax emulsion has a particle diameter that is less than 50 nm. In some other examples, the wax emulsion and the liquid ink are free from wax particles with a particle diameter equal to or greater than 50 nm. An example of a suitable wax is a wax emulsion such as Liquilube® 405, available from Lubrizol (Wickliffe, Ohio). In some examples, the wax can be present in an amount ranging from about 0.2 wt % to about 2.5 wt %. In some other examples, the wax can be present in an amount ranging from about 0.3 wt % to about 2 wt %. In some other examples, the wax can be present in an amount ranging from about 0.5 wt % to about 1 wt %. The wax emulsion may be present in the liquid ink in an amount ranging from about 0.1 wt % to about 1.5 wt % (based on the total wt % of the ink).

Water and Other Ingredients

The inkjet ink compositions described herein also include water (e.g., deionized water) in amounts to make up the balance of the inkjet ink compositions. In some examples, water can be present in the inkjet compositions in amounts greater than about 50 wt % based on the total weight of the inkjet ink composition. In some examples, the water can be present in the inkjet ink compositions in amounts from about 50 wt % to about 90 wt % based on the total weight of the inkjet ink composition. In other examples, the inkjet ink composition can include from about 60 wt % to about 88 wt % water. In further examples, the inkjet ink composition can include from about 70 wt % to about 85 wt % water.

The ink compositions that are part of the ink set might also comprise optional ingredients that are part of the ink vehicle. Such optional ingredient could be for examples, antimicrobial agents or anti-kogation agent. In some examples, the ink vehicle of the liquid thermal inkjet ink may also include viscosity modifier, materials for pH adjustment, sequestering agent, preservative, jettability additive, and the like.

The liquid vehicle may also include antimicrobial agent. Suitable antimicrobial agents include biocides and fungicides. Example antimicrobial agents may include the Nuosept® (Ashland Inc.), Ucarcide® or Kordek® (Dow Chemical Co.), Proxel® (Arch Chemicals) series. Acidic series (from Thor) and combinations thereof. In an example, the liquid ink may include a total amount of antimicrobial agents that ranges from about 0.1 wt % to about 0.25 wt %. In some instances, the antimicrobial agent may be present in the pigment dispersion that is added to the other ink components.

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as Crodafos® 03A or Crodafos® N-3 acid) or dextran 500k. Other suitable examples of the anti-kogation agents include Crodafos® HCE (phosphate-ester from Croda Int.), Crodafos® N10 (oleth-10-phosphate from Croda Int.), or Dispersogen® LFH (polymeric dispersing agent with aromatic anchoring groups, acid form, anionic, from Clariant), etc. The anti-kogation agent may be present in the liquid ink in an amount ranging from about 0.1 wt % to about 1 wt % of the total wt % of the liquid ink.

Inkjet Printing System

The present invention disclosure relates to an inkjet printing system and a method of printing in an inkjet printing system. In some examples, the inkjet printing system is a two-stage inkjet printing system including a fixer dispensing unit for dispensing a pre-treatment fixing fluid composition and an ink dispensing unit for dispensing an ink composition on the substrate during printing. Further, the inkjet printing system can include a drying unit for drying the print on the substrate once the fixer composition and the ink composition are applied thereon.

In some examples, the inkjet printing system comprises a fixer dispensing unit for applying a pre-treatment fixing fluid composition on a printable medium, wherein the pre-treatment fixing fluid composition comprises calcium-containing crashing agents, at least a co-solvent, one or more surfactants, and a balance of water; and at least an ink dispensing unit, for applying an ink composition on the printable medium, wherein the ink composition comprises a pigment dispersion, a surfactant, a polyurethane binder, a co-solvent and a balance of water.

In some other examples, the ink dispensing unit comprises several ink chambers with inks of different colors, said inks being one or more inks selected from the group consisting of a black ink with a black pigment dispersion; a yellow ink with a yellow pigment dispersion; a cyan ink with a cyan pigment dispersion; a magenta ink with a magenta pigment dispersion; an orange ink with an orange pigment dispersion; a violet ink with a violet pigment dispersion and a green ink with a green pigment dispersion.

The fixer dispensing unit can include a fixer reservoir to store the fixer composition and a fixer nozzle to eject the fixer composition on the printable medium (i.e substrate) during printing. In said example, the ink dispensing unit can have a structure similar to the fixer dispensing unit, and can include an ink reservoir to store the ink composition and an ink nozzle to eject the ink composition on the substrate for printing. In one case, the fixer dispensing unit can be provided upstream of the ink dispensing unit. In such a case, the fixer composition may be applied on the substrate (or printable medium) before the application of the ink composition. During operation of the inkjet printing system, the fixer dispensing unit applies the fixer composition on the printable medium and, while the fixer is wet, the ink dispensing unit dispenses the ink composition on the printable medium. The printable medium is subsequently dried to obtain a print. Therefore, the ink and fixer composition according to the present subject matter can be used in wet-on-wet printing technique. Since the coating of the fixer composition may not have to be dried before the ink composition can be applied thereon, a considerably high speed of printing can be achieved.

Therefore, as mentioned above, the combination of the ink and fixer compositions can be used for high speed printing in the inkjet printing systems for a variety of substrates or printable medium, including slow-absorbing printing media, such as coated offset media or other semi-porous media. For instance, the ink and fixer composition can allow use of inexpensive, off-the-shelf slow-absorbing printing media for high speed and high quality printing. For example, the inkjet printing system can have a printing speed of about 1000 feet per minute (fpm), and can provide a durable and smear-resistant print which has a glossy texture and water fast colors. In one case, the inkjet printing system can achieve printing speeds in the range of about 100 fpm to 1000 fpm with the ink composition and the fixer composition used in the manner described above, without compromising on the quality or durability of the print.

FIG. 1 illustrates a schematic of an inkjet printing system 100, according to an example of the present disclosures. In an example, the inkjet printing system 100 can be a two-stage printing system having a fixer dispensing unit 200 and an ink dispensing unit 300, and can be used for printing on a substrate (or printable medium) 400. The fixer dispensing unit 200 and the ink dispensing unit 300 can dispense the fixer composition and the ink composition, respectively, as disclosed in the present subject matter, for achieving high speed printing with durable quality of prints.

In some examples, the system for printing an ink set, or inkjet printing system, 100 includes a fixer dispensing unit 200 and an ink dispensing unit 300. The fixer dispensing unit 200 comprises pre-treatment fixing fluid composition 210 that is contained in a chamber (or reservoir) 220 which is fluidically coupled to a fluid ejector (or nozzle) 230. The ink dispensing unit 300 comprises an ink composition 310 that is contained in a chamber (or reservoir) 320 which is fluidically coupled to an inkjet fluid ejector (or nozzle) 330.

The fixer dispensing unit 200 can include a fixer reservoir or chamber 220 for storing the fixer composition and a fixer nozzle 230 for ejecting the fixer composition 210 on the upper surface 410 of a substrate 400 during printing. Similarly, the ink dispensing unit 300 can include an ink reservoir 320 for storing the ink composition 310 and an ink nozzle 330 for ejecting the ink composition on the substrate or printable medium 400. In some examples, each of the dispensing units is configured to eject its respective fixer or ink compositions onto a surface 410 of a print media 400 during the printing process.

In some examples, the chambers 220 and 320 are ink or fixer reservoirs that are in fluid communication with fluid ejectors 230 and 330 that are inkjet printhead. Said fluid communication can be done thought a fluid conduit. In some other examples, the chambers 220 and 320 are ink or fixer reservoirs and are part of inkjet cartridges, the ink or fixer reservoirs are in direct fluid communication with the inkjet printhead.

Figure 2:
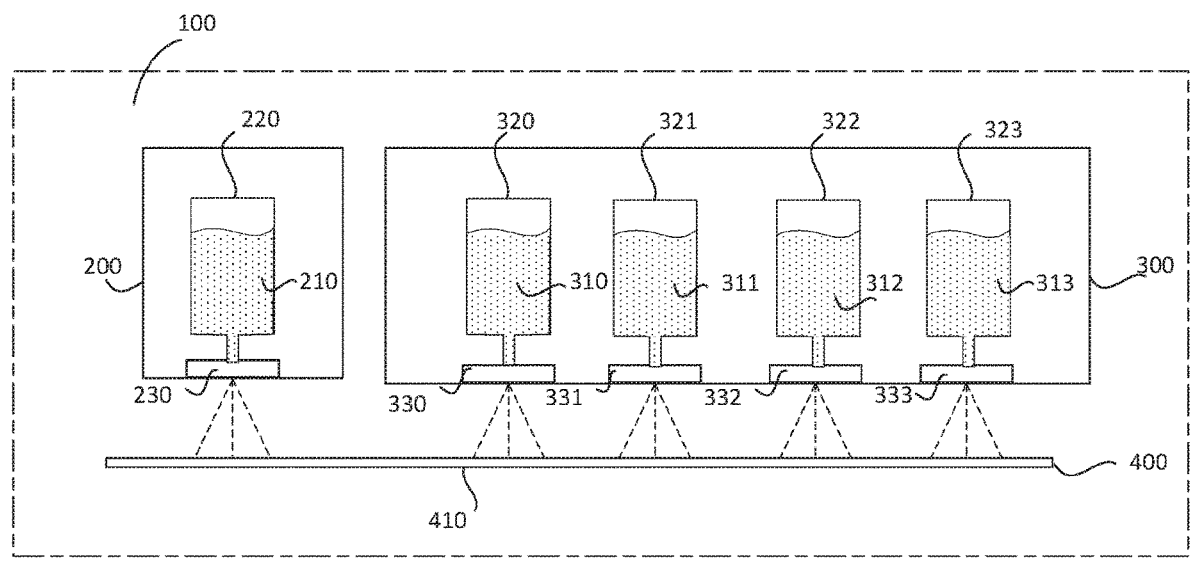
FIG. 2 is a schematic illustration of another example of an inkjet printing system according to another example of the present disclosure.

FIG. 2 illustrates a schematic of an inkjet printing system 100, according to another example of the present disclosures. The system for printing an ink set, or inkjet printing system, 100 include a fixer dispensing unit 200 and an ink dispensing unit 300 that comprises a plurality of additional fluid ejectors, each of which are fluidically coupled to at least one other chamber. In some example, the ink dispensing unit 300 comprises several inks chambers 320, 321, 322 and 323 containing different inks of different colors (i.e. containing different pigments). In some examples, the inkjet printing system has an ink dispensing unit that comprises several ink chambers with inks of different colors. The ink dispensing unit 300 can comprise a first ink chamber 320 including a black ink 310; a second ink chamber 321 including a yellow ink 311; a third ink chamber 322 including a cyan ink 312 and a fourth ink chamber 323 including a magenta ink 323, for example. It is to be understood that any suitable or desired number of fluid ejectors and chambers may be used in the inkjet printing system 100 described herein. Further, it is to be understood that the ink chambers may be in fluid communication with a single fluid ejector, or may be in fluid communication with their own respective fluid ejectors.

In one case, the inkjet printing system 100 can be thermal inkjet printing system which involves use of heat for achieving ejection of the fixer composition and the ink composition from the fixer dispensing unit 200 and the ink dispensing unit 300, respectively. In another case, the inkjet printing system 100 can be a charge controlled printing system in which electrostatic attraction is used for ejecting the fixer composition from the fixer dispensing unit 200 and ink composition from the ink dispensing unit 300. In yet another case, the inkjet printing system 100 can use vibration pressure generated by a piezoelectric element for ejecting ink composition and fixer composition. In still another example, the inkjet printing system 100 can use an acoustic technique for ejection of the two compositions. In this case, an electric signal is transformed into an acoustic beam and the compositions are irradiated by the acoustic beam so as to be ejected by radiation pressure. The inkjet printing system 100 can use a combination of the above-mentioned techniques for ejection of the ink and fixer compositions. For example, the fixer dispensing unit 200 can use one of the above-mentioned techniques for dispensing the fixer and the ink dispensing unit 300 can use another above-mentioned technique for dispensing the ink.

In some examples, the inkjet printing system 100 can include a substrate guiding unit for handling the substrate web during printing and a drying unit for drying the fixer and ink compositions applied on the substrate web. In one case, the substrate guiding unit can include a web mounting spool on which a substrate web is mounted. In addition, the substrate guiding unit can include a puller assembly and a plurality of web guides. The puller assembly can continuously pull the substrate web from the web mounting spool, during printing operation of the inkjet printing system 100. In one case, the puller assembly can include a pair of contact rollers having an anti-friction coating, say rubber coating, thereon. The substrate web can pass through the pair of contact rollers and be pulled by the rotational motion of the rollers. Further, the puller assembly can be provided downstream with respect to the fixer dispensing unit 200 and the ink dispensing unit 300. The plurality of web guides can support the substrate web and maintain adequate tension in the substrate web, during the movement of the substrate web for printing. In an example, the plurality of guides can include adjustable rollers for adjusting the tension in the substrate web for effective operation.

In one example, the drying unit can be an air-dryer for blow-drying the print on the substrate. In such a case, the drying unit can have an air circulation device, say a fan, for creating air flow, a heating element for heating the air, and one or more air channels for directing the hot air towards the substrate with the wet print thereon. In another example, the drying unit can simply be formed by one or more heating elements. In such a case, the substrate with the wet print can be passed in vicinity of the heating elements for facilitating the drying of the wet print. In operation, the substrate guiding unit can provide for continuous running of the substrate web under the print-head. According to an aspect, the fixer dispensing unit 200 applies the fixer composition on the substrate web and, while the fixer is wet, the ink dispensing unit 300 dispenses the ink composition on the substrate. The inkjet printing system 100, therefore, in such a case, can use wet-on-wet printing technique for printing on the substrate.

Method for Printing

The present invention disclosure relates to a method of printing in an inkjet printing system. In some examples, the method for printing in an inkjet printing system comprises applying a pre-treatment fixing fluid composition on a printable medium, the pre-treatment fixing fluid composition comprising calcium-containing crashing agents, at least a co-solvent, one or more surfactants, and a balance of water; applying an ink composition over the fixer composition, on the printable medium while the fixer composition is wet, wherein the ink composition comprises a pigment dispersion, a surfactant, a polyurethane binder, a co-solvent and a balance of water and drying the fixer composition and the ink composition to obtain a print on the printable medium.

The printing of the pre-treatment fixing fluid may be accomplished using a high speed printing apparatus at print speeds of at least 50 fpm, and up to 1000 fpm. Examples of suitable high speed printing apparatuses include thermal inkjet printers or web presses, piezoelectric inkjet printers or web presses, or continuous inkjet printers or web presses. The pre-treatment fixing fluid may be printed directly onto a surface of coated offset medium. The pre-treatment fixing fluid may be the composition disclosed above.

In one example of the printing method, no drying operation is performed after the pre-treatment fixing fluid is applied on the medium. Rather, while the pre-treatment fixing fluid is wet, an inkjet ink is deposited on the medium with the pre-treatment fixing fluid thereon. In other words, after the pre-treatment fixing fluid is applied to the medium, the inkjet ink may be applied to the wet pre-treatment fixing fluid coated on the medium. When multiple ink colors are used, it is to be understood that all of the inks are applied while previously deposited layers are still wet.

In some examples, the fixer and the ink composition disclosed herein, are established on at least a portion of a print media or substrate to form an image (i.e., text, graphics, etc.) using a printing technique. The amount of fixer and ink used depends, at least in part, on the desirable image to be formed. The ink composition may be deposited, established, or printed on the printable medium using any suitable printing device. In some examples, the ink composition is applied to the printable medium via inkjet printing techniques. The ink may be deposited, established, or printed on the medium via continuous inkjet printing or via drop-on-demand inkjet printing, which includes thermal inkjet printing and piezoelectric inkjet printing. The resulting printed image will have, for examples, enhanced image quality and image permanence. The printable medium or media that will be printed may be any type of printable media. The printable medium can be specifically designed to receive any inkjet printable ink. The media can thus be a coated or un-coated media and on corrugated paper and on not-corrugated paper, for example.

In some examples, the printable medium is a packaging recording substrate, a label or a label stock. Packaging recording media or labels are indeed particularly well suited with the use of this ink set ink. As "packaging recording substrate", it is meant herein non-absorptive plastics and films thereof employed for so-called soft packaging, in addition to non-coated paper and coated paper. The packaging recording substrate can be packaging glassware (beverage bottles, cosmetic containers) or commercial glassware. A "label" is defined herein as a piece of paper, polymer, cloth, metal, or other material affixed to a container or article. As "label stock", it is meant herein a media substrate that can be coated on one side with adhesive and that can be printed on the other side. Label stocks can be a wide variety of papers, films, fabric, foils, etc. In some other examples, the recording media is a dark packaging recording media or dark label stock media.

EXAMPLES

Ingredients:

TABLE 1

| Ingredient name | Nature of the ingredient | supplier |
| --- | --- | --- |
| Polyurethane polymer | Grafted polyurethane polymer | HP Inc. |
| Surfynol ® 440 | Surfactants | Air Products |
| Dynol ® 360 | Surfactants | Air Products |
| Crodafos ® N3 | Phosphate Ester | Croda |
| LEG-1 | Glyerol ethoxylate | Lipo Chemicals Inc. |
| Dowanol ® TPM | Tripropylene Glycol Methyl Ether | Dow chemical |
| Glycerol | 1,2,3-propanetriol, glycerin | Sigma-Aldrich |
| Liquilube ® LL 405 | wax | Lubrizol |
| Black Dispersion | Pigment with styrene acrylic dispersant | HP Inc. |
| Cyan Dispersion | Pigment with styrene acrylic dispersant | HP Inc. |
| Magenta Dispersion | Pigment with styrene acrylic dispersant | HP Inc. |
| Yellow Dispersion | Pigment with styrene acrylic dispersant | HP Inc. |
| Orange Dispersion | Pigment with styrene acrylic dispersant | HP Inc. |
| Green Dispersion | Pigment with styrene acrylic dispersant | HP Inc. |
| Violet Dispersion | Pigment with styrene acrylic dispersant | HP Inc. |
| Acticide ® B20 | biocide | Thor |
| Acticide ® M20 | biocide | Thor |
| Calcium Propionate | metal carboxylate salt | Niacet |
| Calcium Nitrate | water-soluble polyvalent metal salt | BASF |
| Surfynol ® SEF | Surfactant | Air Products |
| Surfynol ® CT-211 | Surfactant | Air Products |
| Tiron ® | Disodium 4,5-Dihydroxybenzene-1,3-Disulphonate | Sigma-Aldrich |
| Tetraethylene glycol | Co-solvent | Sigma-Aldrich |

Example 1—Ink Set Ink and Ink Composition

Different inkjet ink compositions are prepared with the components and the amounts as listed in Table 2. All percentages are expressed in wt % of the total weight of the ink composition. The pH is adjusted by addition of KOH to achieve a pH of about 8.5. Table 2, below, shows constituents of seven different ink compositions. Ink 1 is a black ink comprising a back pigment; Ink 2 is a cyan ink comprising a cyan pigment; Ink 3 is a magenta ink comprising a magenta pigment; Ink 4 is a yellow ink comprising a yellow pigment; Ink 5 is an orange ink comprising an orange pigment; Ink 6 is a green ink comprising a green pigment; Ink 7 is a violet ink comprising a violet pigment.

| Components | Ink 1 | Ink 2 | Ink 3 | Ink 4 | Ink 5 | Ink 6 | Ink 7 |
| --- | --- | --- | --- | --- | --- | --- | --- |
| Polyurethane Polymer | 5.00% | 3.50% | 3.50% | 3.50% | 3.50% | 3.50% | 3.50% |
| Surfynol ® 440 | 0.15% | 0.15% | 0.15% | 0.15% | 0.15% | 0.15% | 0.15% |
| Dynol ® 360 | 0.15% | 0.15% | 0.15% | 0.15% | 0.15% | 0.15% | 0.15% |
| Crodafos ® N3 | 0.50% | 0.50% | 0.50% | 0.50% | 0.50% | 0.50% | 0.50% |
| LEG-1 | 2.00% | 1.00% | 2.00% | 2.00% | 2.00% | 2.00% | 2.00% |

-continued

| Components | Ink 1 | Ink 2 | Ink 3 | Ink 4 | Ink 5 | Ink 6 | Ink 7 |
|---|---|---|---|---|---|---|---|
| Dowanol ® TPM | 2.00% | 2.00% | 2.00% | 3.00% | 3.00% | 3.00% | 3.00% |
| Glycerol | 7.00% | 6.00% | 7.00% | 7.00% | 7.00% | 7.00% | 7.00% |
| Liquilube ® LL 405 | 0.75% | 0.50% | 0.50% | 0.50% | 0.50% | 0.50% | 0.50% |
| Black Dispersion | 2.75% | | | | | | |
| Cyan Dispersion | | 2.25% | | | | | |
| Magenta Dispersion | | | 4.00% | | | | |
| Yellow Dispersion | | | | 4.00% | | | |
| Orange Dispersion | | | | | 4.25% | | |
| Green Dispersion | | | | | | 3.40% | |
| Violet Dispersion | | | | | | | 1.5% |
| Acticide ® B20 | 0.15% | 0.15% | 0.15% | 0.15% | 0.15% | 0.15% | 0.15% |
| Acticide ® M20 | 0.07% | 0.07% | 0.07% | 0.07% | 0.07% | 0.07% | 0.07% |
| Water | balance | balance | balance | balance | balance | balance | balance |

The fixer composition A is prepared in accordance with Table 3 below. All percentages are expressed in wt % of the total weight of the fixer composition. All inkjet ink compositions 1 to 7 and the fixer composition A are then loaded into an ink set.

| Components | Fixer A |
|---|---|
| Calcium Propionate | 2.800% |
| Calcium Nitrate•4H2O | 8.000% |
| Surfynol ® SEF | 0.045% |
| Surfynol ® CT-211 | 0.02% |
| Tiron ® | 0.095% |
| Tetraethylene glycol | 12.00% |
| Acticide ® B20 | 0.20% |
| Acticide ® M20 | 0.07% |
| Water | Balance |

Example 2—Print Performances

The ink set comprising the ink compositions 1 to 7 and the fixer composition A are printed on different paper-based media. Glossy coated offset media and porous uncoated paper are used for comparing the print performance of the above combinations of inks and fixer compositions. The equipment used for printing includes a prototype printer with a media conveyer and ink nozzle positions selected to simulate high speed printing. The media conveyor is set at a speed of about 100 fpm. In addition, infrared (IR) drying and convection drying techniques are used for drying the print. The resulting printed articles are then tested for their print quality and for their durability. The ink set is also evaluated for its print reliability. A glossy coated offset media (Sterling UltraGloss) and a porous uncoated paper (Accent Opaque®) are used for comparing the print performance of the combinations of ink compositions and fixer composition. The wet rub performance and the change in the black optical density (as a result of abrasion or rubbing) is also evaluated.

Wet rub performances of prints on the substrates are tested with a Taber® linear abrader using a water wet cloth to wipe the printed matter in one 2" cycle with a force of about 250 grams (g). A change in the optical density of black print on the two substrates as a result of abrasion or rubbing is also determined. The optical density is measured and recorded before and after each abrasion with an X-Rite® spectrophotometer.

The results obtained demonstrate that the use of the fixer composition A in combination with any of the ink composition 1 to 7 significantly improve wet rub performances and black optical density of the printed samples. Such results are independent of the nature of the printable media that is used. The ink sets tested herein also demonstrates excellent jettability performances (i.e. good print reliability): the combination of the fixer composition A with ink compositions 1 to 7 have shown outstanding decap performances by comparison with ink set test not having the formation described herein.

The invention claimed is:
1. An inkjet ink set comprising:
   a. a pre-treatment fixing fluid including a combination of calcium-containing crashing agents consisting of i) from greater than 0 wt % to about 10 wt % of a metal carboxylate salt selected from the group consisting of calcium propionate salt, calcium acetate salt and calcium butyrate salt, and ii) from greater than 0 wt % to about 15 wt % of a water-soluble polyvalent metal salt selected from the group consisting of calcium nitrate, $CaCl_2$, and $Ca(OH)_2$, at least a co-solvent, a combination of surfactants consisting of i) from 0.05 wt % to about 1.5 wt % of a first surfactant having a hydrophilic lipophilic balance (HLB) less than about 6 and ii) from about 0 wt % to about 0.1 wt % of a second surfactant having an HLB greater than 6, and a balance of water; and
   b. a liquid ink including a pigment dispersion, a surfactant, a polyurethane binder, a co-solvent and a balance of water.

2. The inkjet ink set as defined in claim 1 comprising several liquid inks, such inks being one or several inks selected from the group consisting of a black ink with a black pigment dispersion, a yellow ink with a yellow pigment dispersion, a cyan ink with a cyan pigment dispersion, a magenta ink with a magenta pigment dispersion, an orange ink with an orange pigment dispersion, a violet ink with a violet pigment dispersion and a green ink with a green pigment dispersion; and wherein at least one of these inks further includes a surfactant, a polyurethane binder, a co-solvent and a balance of water.

3. The inkjet ink set as defined in claim 1 wherein, in the pre-treatment fixing fluid, the combination of the calcium-containing crashing agents consists of the calcium propionate salt and calcium nitrate.

4. The inkjet ink set as defined in claim 1 wherein, in the pre-treatment fixing fluid, the first surfactant includes ethoxylated 2,4,7,9-tetramethyl-5-decyne-4,7-diol and wherein the second surfactant includes poly(oxy-1,2-ethanediyl), α-(nonylphenyl)-ω-hydroxy-, branched plus 2,4,7,9-tetramethyl-5-decyne-4,7-diol.

5. The inkjet ink set as defined in claim 1 wherein, in the pre-treatment fixing fluid, the co-solvent is a glycol ether co-solvent.

6. The inkjet ink set as defined in claim 1 wherein, in the liquid ink, the polyurethane binder is a polyurethane graph polyol dispersion.

7. The inkjet ink set as defined in claim 1 wherein, in the liquid ink, the polyurethane binder contains a polyisocyanate, a first polyol having a chain with two hydroxyl functional groups at one end of the chain and no hydroxyl groups at an opposed end of the chain and a second polyol having a chain with two hydroxyl functional groups at both ends of the chain.

8. The inkjet ink set of claim 1 wherein, in the liquid ink, the surfactant is a non-ionic surfactant including an acetylenic surfactant and/or a phosphate surfactant.

9. The inkjet ink set as defined in claim 1 wherein the liquid ink further comprises a polyethylene wax emulsion.

10. An inkjet printing system comprising:
    a. a fixer dispensing unit including the pre-treatment fixing fluid composition of claim 1 therein, wherein the fixer dispensing unit is for applying a pre-treatment fixing fluid composition on a printable medium; and
    b. an ink dispensing unit, for applying an ink composition on the printable medium, comprising at least one ink chamber containing an ink composition comprising a pigment dispersion, a surfactant, a polyurethane binder, a co-solvent and a balance of water.

11. The inkjet printing system as defined in claim 10 wherein the ink dispensing unit comprises several ink chambers with inks of different colors, said inks being one or more inks selected from the group consisting of a black ink with a black pigment dispersion; a yellow ink with a yellow pigment dispersion; a cyan ink with a cyan pigment dispersion; a magenta ink with a magenta pigment dispersion; an orange ink with an orange pigment dispersion; a violet ink with a violet pigment dispersion and a green ink with a green pigment dispersion.

12. A method for printing in an inkjet printing system, the method comprising:
    a. applying the pre-treatment fixing fluid composition of claim 1 on a printable medium;
    b. applying an ink composition over the pre-treatment fixing fluid composition, on the printable medium while the pre-treatment fixing fluid composition is wet, wherein the ink composition comprises a pigment dispersion, a surfactant, a polyurethane binder, a co-solvent and a balance of water; and
    c. drying the pre-treatment fixing fluid composition and the ink composition to obtain a print on the printable medium.

13. The inkjet ink set as defined in claim 1 wherein the combination of calcium-containing crashing agents consists of about 2.8 wt % of the calcium propionate salt and about 8 wt % of calcium nitrate.

14. The inkjet ink set as defined in claim 13 wherein the combination of surfactants consists of about 0.045 wt % of ethoxylated 2,4,7,9-tetramethyl-5-decyne-4,7-diol and about 0.02 wt % of poly(oxy-1,2-ethanediyl), α-(nonylphenyl)-ω-hydroxy-, branched plus 2,4,7,9-tetramethyl-5-decyne-4,7-diol.

* * * * *